United States Patent
Mukouyama et al.

(10) Patent No.: US 9,032,242 B2
(45) Date of Patent: May 12, 2015

(54) TRANSMISSION DEVICE, TRANSMISSION SYSTEM, AND FAULT NOTIFICATION METHOD

(75) Inventors: Motohiro Mukouyama, Tokyo (JP); Kaichiro Saito, Tokyo (JP)

(73) Assignee: NEC Corporation, Tokyo (JP)

( * ) Notice: Subject to any disclaimer, the term of this patent is extended or adjusted under 35 U.S.C. 154(b) by 155 days.

(21) Appl. No.: 13/822,195

(22) PCT Filed: Oct. 28, 2011

(86) PCT No.: PCT/JP2011/006037
§ 371 (c)(1),
(2), (4) Date: Mar. 11, 2013

(87) PCT Pub. No.: WO2012/056711
PCT Pub. Date: May 3, 2012

(65) Prior Publication Data
US 2013/0173969 A1 Jul. 4, 2013

(30) Foreign Application Priority Data
Oct. 28, 2010 (JP) ................................. 2010-242092

(51) Int. Cl.
*G06F 11/00* (2006.01)
*G06F 11/07* (2006.01)
*G06F 3/06* (2006.01)
*H04L 12/24* (2006.01)
*H04L 12/26* (2006.01)
*H04L 29/14* (2006.01)

(52) U.S. Cl.
CPC ........ *G06F 11/0766* (2013.01); *G06F 11/0793* (2013.01); *G06F 3/0635* (2013.01); *H04L 41/06* (2013.01); *H04L 43/0811* (2013.01); *H04L 41/0893* (2013.01); *H04L 69/40* (2013.01)

(58) Field of Classification Search
CPC  G06F 11/0766; G06F 11/0793; G06F 3/0635
See application file for complete search history.

(56) References Cited

U.S. PATENT DOCUMENTS 6,853,887 B1 * 2/2005 Greenwell ........................ 701/1

FOREIGN PATENT DOCUMENTS

| CN | 101459549 A | 6/2009 |
|----|-------------|--------|
| CN | 101511100 A | 8/2009 |

(Continued)

OTHER PUBLICATIONS

Communication dated Dec. 3, 2014 from the State Intellectual Property Office of the People's Republic of China in counterpart application No. 201180045457.9.

*Primary Examiner* — Charles Ehne
(74) *Attorney, Agent, or Firm* — Sughrue Mion, PLLC

(57) ABSTRACT

A link failure information transmission unit 130 of a transmission device 100 transmits link failure information indicating a fault in a link group to an opposing transmission device, upon detection of a fault in one or more of wired transmission lines belonging to any of link groups of the transmission device 100. Upon receiving the link failure information from the opposing transmission device, a link control unit 140 disconnects wired transmission lines included in a link group in the transmission device 100 corresponding to the link group in the opposing transmission device indicated by the received link failure information among the link groups of the transmission device 100. When the occurrence of a fault is notified in a system where transmission devices connected through an inter-transmission-device transmission line transmit signals of multiple wired transmission lines connected to the transmission devices, deterioration in communication efficiency of the entire system is avoided.

12 Claims, 11 Drawing Sheets

(56) References Cited

FOREIGN PATENT DOCUMENTS

| CN | 101640617 A | 2/2010 |
|----|-------------|--------|
| JP | 10-013436 A | 1/1998 |
| JP | 2005-217565 A | 8/2005 |
| JP | 2006-067239 A | 3/2006 |
| JP | 2006-115034 A | 4/2006 |
| JP | 2006-325002 A | 11/2006 |

* cited by examiner

OWN DEVICE GROUP INFORMATION

| LINK GROUP 1A | LINK GROUP 2A | LINK GROUP 3A |
|---|---|---|
| R1, R2 | R3 | R4 |
| INTER-DEVICE TRANSMISSION LINE | INTER-DEVICE TRANSMISSION LINE | INTER-DEVICE TRANSMISSION LINE |

Fig. 2

INTER-DEVICE GROUP INFORMATION

| LINK GROUP OWN DEVICE | OPPOSING DEVICE LINK GROUP |
|---|---|
| LINK GROUP 1A | LINK GROUP 1B, 2B |
| LINK GROUP 2A | LINK GROUP 2B |
| LINK GROUP 3A | LINK GROUP 3B |

Fig. 3

OWN DEVICE GROUP INFORMATION

| LINK GROUP 1A | LINK GROUP 2A | LINK GROUP 3A |
|---|---|---|
| R1 | R2, R3 | R4 |
| FIRST INTER-DEVICE TRANSMISSION LINE | FIRST INTER-DEVICE TRANSMISSION LINE, SECOND INTER-DEVICE TRANSMISSION LINE | SECOND INTER-DEVICE TRANSMISSION LINE |

Fig. 4

INTER-DEVICE GROUP INFORMATION

| OWN DEVICE LINK GROUP | FIRST OPPOSING DEVICE LINK GROUP | SECOND OPPOSING DEVICE LINK GROUP |
|---|---|---|
| LINK GROUP 1A | LINK GROUP 1B, 2B | |
| LINK GROUP 2A | LINK GROUP 3B | LINK GROUP 1C, 2C |
| LINK GROUP 3A | | LINK GROUP 3C |

Fig. 5

TRANSMISSION DEVICE, TRANSMISSION SYSTEM, AND FAULT NOTIFICATION METHOD

CROSS REFERENCE TO RELATED APPLICATIONS

This application is a National Stage of International Application No. PCT/JP2011/006037 filed Oct. 28, 2011, claiming priority based on Japanese Patent Application No. 2010-242092 filed Oct. 28, 2010, the contents of all of which are incorporated herein by reference in their entirety.

TECHNICAL FIELD

The present invention relates to a fault notification technique, and more particularly, to a fault notification technique in a system in which transmission devices that are connected through an inter-transmission-device transmission line transmit signals of a plurality of wired transmission lines connected to the transmission devices.

BACKGROUND ART

A system is known in which LAN (Local Area Network) signals that are standardized by IEEE802.3, for example, are transmitted and received using a wireless transmission line as a part of transmission lines. In such a system, a terminal station connected to a network device through a wired transmission line transmits LAN signals from the network device to a counterpart station, which is connected to the terminal station so as to be opposite each other through a wireless transmission line, and the counterpart station outputs the signals received via the wireless transmission line to the network device connected to the own station through a wired transmission line.

In contrast to the system described above, Patent Literature 1 discloses a technique in which if any of terminal stations connected through a wireless transmission line detects a fault in transmission lines (a wired transmission line and a wireless transmission line which are connected to the terminal station), the network device of the own station is notified of the fault, and the network device of the opposing terminal station is also notified of the fault.

In this technique, upon detection of a fault in a transmission line, the terminal station disconnects the wired transmission line connected to the terminal station. Further, the terminal station replaces a control signal sequence for notifying the fault with a data string, and outputs the data string to the wireless transmission line, thereby transmitting the control signal sequence to the opposing terminal station. Also when the above-mentioned control signal sequence is received from the opposing terminal station, the terminal station disconnects the wired transmission line of the own station.

According to this technique, when the terminal station detects a fault in a transmission line, the terminal station can notify the network device connected to the own station of the fault, and also when the opposing terminal station detects a fault in a transmission line, the terminal station can notify the network device connected to the own station of the fault.

With the recent advancement of IP technology, in the system as described above, each terminal station accommodates a plurality of wired transmission lines and has a switching function in many cases.

Patent Literature 1 discloses a technique in which each network device of the own station and each network device of the counterpart station are notified of a fault also in a system in which each terminal station accommodates a plurality of wired transmission lines (FIG. 8 and paragraphs [0076] and [0077] of Patent Literature 1).

In this technique, each terminal station has a function of detecting, for the plurality of wired transmission lines of the own station, a fault in the wired transmission lines, a function of detecting a fault in the wireless transmission line, and a function of outputting the above-mentioned control signal sequence to the wireless transmission line upon detection of a fault, and disconnects the wired transmission lines when a fault is detected and when the above-mentioned control signal sequence is received from the opposing terminal station.

According to this technique, also in the system in which each terminal station accommodates a plurality of wired transmission lines, when the own station detects a fault in a transmission line, the terminal station can notify the network device connected to the own station of the fault, and also when the opposing terminal station detects a fault in a transmission line, the terminal station can also notify the network device connected to the own station of the fault.

The present invention can be applied not only to a system using a wireless transmission line as a part of transmission lines, but also to a system in which transmission devices connected through a transmission line (corresponding to the above-mentioned wireless transmission line) that connects the transmission devices (corresponding to the above-mentioned terminal stations) transmit signals of a plurality of wired transmission lines connected to the transmission devices.

A research of related art was conducted after the present invention was made, and the research shows that Patent Literature 2 discloses a fault notification technique using a multiplexer in a system in which communication between frame relay terminals (hereinafter referred to as "FR terminals"), such as a frame relay router, is relayed through an ATM (asynchronous transmission mode) line.

The above-mentioned multiplexer includes a frame relay interface accommodation unit (hereinafter referred to as "RF interface accommodation unit") which is provided for each RF terminal and accommodates the RF terminal; an ATM switch unit; and a plurality of ATM cell multiplexing units.

Frame data from each FR terminal is converted into an ATM cell by the RF interface accommodation unit that accommodates the FR terminal, and is then output to any of the plurality of ATM cell multiplexing units through the ATM switch unit.

Each of the ATM cell multiplexing units is configured to multiplex ATM cells from a plurality of outgoing lines of the ATM switch unit and to send out the multiplexed ATM cells to an ATM line. Each of the ATM cell multiplexing unit has a function of monitoring congestion. When congestion occurs, the ATM cell multiplexing unit needs to notify the FR terminal of the congestion, because the ATM cell received from the ATM switch unit is to be discarded.

Heretofore, when congestion is detected, the ATM cell multiplexing unit notifies, for each logical channel (virtual channel identifier: VCI) multiplexed, the RF interface accommodation unit corresponding to the logical channel of the congestion by using a management cell indicating the congestion. The RF interface accommodation unit having received the notification requests, for each notification, a frame logical channel (FR-DLCI) corresponding to the logical channel in the ATM of the notification. Further, the RF interface accommodation unit generates a notification frame which is in compliant with a frame relay standard interface protocol and in which a BENC bit is significant, and transmits the generated notification frame to the FR terminal.

According to the related art technique, however, when a plurality of logical channels is set between a single RF interface accommodation unit and the ATM cell multiplexing unit having detected the congestion, the congestion is notified for each logical channel. Accordingly, a plurality of congestion notifications is generated every time congestion is detected in a single ATM cell multiplexing unit. As a result, when the number of logical channels set to the same ATM line (the number of logical channels to be processed by a single ATM cell multiplexing unit) is large, the number of congestion notifications increases. Further, the RF interface accommodation unit performs processing of receiving the congestion notifications subsequently sent from the ATM cell multiplexing unit, and processing of transmitting the congestion notifications to the accommodated FR terminal, so that the congestion notification processing is complicated and the processing itself becomes congested. Furthermore, the ATM cell multiplexing unit also needs to execute the notification operation by the number of logical channels set to the same ATM line, which results in an increase in processing load.

Such problems occur also when the ATM cell multiplexing unit detects a fault in the ATM cell multiplexing unit itself or a fault in the ATM line and finally notifies the FR terminal of the fault.

According to the technique disclosed in Patent Literature 2, information on all logical channels connected to the ATM cell multiplexing unit is grouped and held for each ATM cell multiplexing unit. Further, when a monitor item abnormality (for example, the above-mentioned congestion or fault) is detected, monitor information including specific information on each group is notified to all RF interface accommodation units, the whole or a part of logical channels of which belong to the group, through the ATM switch unit. The RF interface accommodation units having received the notification, i.e., the RF interface accommodation units, the whole or a part of logical channels of which belong to the group, notify the RF terminal, which corresponds to the logical channel belonging to the group, of the monitor information. According to this technique, the ATM cell multiplexing unit notifies a single RF interface accommodation unit of the monitor information only once. This leads to a reduction in communication processing load of each functional block.

CITATION LIST

Patent Literature

[Patent Literature 1] Japanese Unexamined Patent Application Publication No. 2006-067239
[Patent Literature 2] Japanese Unexamined Patent Application Publication No. 10-013436

SUMMARY OF INVENTION

Technical Problem

Incidentally, as for the fault notification in the system in which a wireless transmission line is used between terminal stations and each terminal station accommodates a plurality of wired transmission lines, the technique disclosed in Patent Literature 1 is capable of notifying a network device connected to the counterpart station of a fault detected in each wired transmission line of the own station, by using the control signal sequence. However, Patent Literature 1 fails to disclose which network device of the own station is to be notified, or which wired transmission line is to be disconnected, by the terminal station having received the control signal sequence.

If the terminal station having received the control signal sequence indicating a fault in one wired transmission line in the counterpart station disconnects all the wired transmission lines of the own station, it is impossible to transmit signals through transmission lines for transmitting signals having no correlation with the wired transmission line in which the fault occurs in the counterpart station. This deteriorates the communication efficiency of the entire system.

According to the technique disclosed in Patent Literature 2, when a plurality of logical channels is set between a single RF interface accommodation unit and the ATM cell multiplexing unit having detected congestion, the congestion is notified for each logical channel. Thus, grouping is performed based on each logical channel so as to solve the problem that a plurality of notifications is generated every time a fault, such as congestion, is detected in a single ATM cell multiplexing unit. Even if a combination of the technique disclosed in Patent Literature 2 and the above-mentioned technique disclosed in Patent Literature 1 is applied to the system in which transmission devices connected through an inter-transmission-device transmission line transmit signals of a plurality of wired transmission lines connected to the transmission devices, the transmission device having received the control signal sequence indicating that a fault is detected in any of the wired transmission lines connected to the opposing transmission device is still incapable of recognizing which of the wired transmission lines connected to the own device is to be disconnected.

The present invention has been made in view of the above-mentioned circumstances, and provides a technique for avoiding deterioration in communication efficiency of the entire system when the occurrence of a fault is notified in a system in which transmission devices connected through an inter-transmission-device transmission line transmit signals of a plurality of wired transmission lines connected to the transmission devices.

Solution to Problem

An exemplary aspect of the present invention is a fault notification method for a transmission device in a system in which a pair of transmission devices connected opposite each other through an inter-transmission-device transmission line transmit signals of a plurality of wired transmission lines connected to the transmission devices. This fault notification method includes an own device group information holding step, an inter-device group information holding step, a link failure information transmission step, and a link control step.

The own device group information holding step includes holding own device group information indicating a correspondence relation between the wired transmission lines connected to the transmission device and link groups to which the wired transmission lines belong. Note that one of the link groups includes at least one wired transmission circuit connected to the transmission device, and the inter-transmission-device transmission line.

The inter-device group holding step includes holding inter-device group information indicating a correspondence relation between the link groups of the transmission device and the link groups of the opposing transmission device connected to the transmission device.

The link failure information transmission step includes transmitting link failure information indicating a fault in a link group to the opposing transmission device connected to the transmission device through the inter-transmission-device transmission line, when a fault in one or more wired transmission lines belonging to any of the link groups of the transmission device is detected, by referring to the own device group information.

In the link control step, upon detection of a fault in any of the wired transmission lines connected to the transmission device, the wired transmission line is disconnected. Further, upon detection of a fault in the inter-transmission-device transmission line, all the wired transmission lines connected to the transmission device are disconnected. Furthermore, upon receiving through the inter-transmission-device transmission line the link failure information indicating a fault in any of the link groups of the opposing transmission device connected to the transmission device, the wired transmission lines, which are included in a link group corresponding to the link group indicated by the received link failure information among the link groups in the transmission device, are disconnected by referring to the inter-device group information and the own device group information.

Note that a transmission device that implements the fault notification method according to the above-mentioned exemplary aspect, a system including the transmission device, a program for causing a computer to execute the method, a recording medium recording the program, and the like are also effective as exemplary aspects of the present invention.

Advantageous Effects of Invention

According to the technique of the present invention, it is possible to avoid deterioration in communication efficiency of the entire system when the occurrence of a fault is notified in a system in which transmission devices connected through an inter-transmission-device transmission line transmit signals of a plurality of wired transmission lines connected to the transmission devices.

BRIEF DESCRIPTION OF DRAWINGS

FIG. 2 is a diagram showing an example of own device group information;

FIG. 3 is a diagram showing an example of inter-device group information;

FIG. 4 is a diagram showing an example of own device group information in the case where a plurality of opposing transmission devices is present;

FIG. 5 is a diagram showing an example of inter-device group information in the case where a plurality of opposing transmission devices is present;

DESCRIPTION OF EMBODIMENTS

Figure 1:
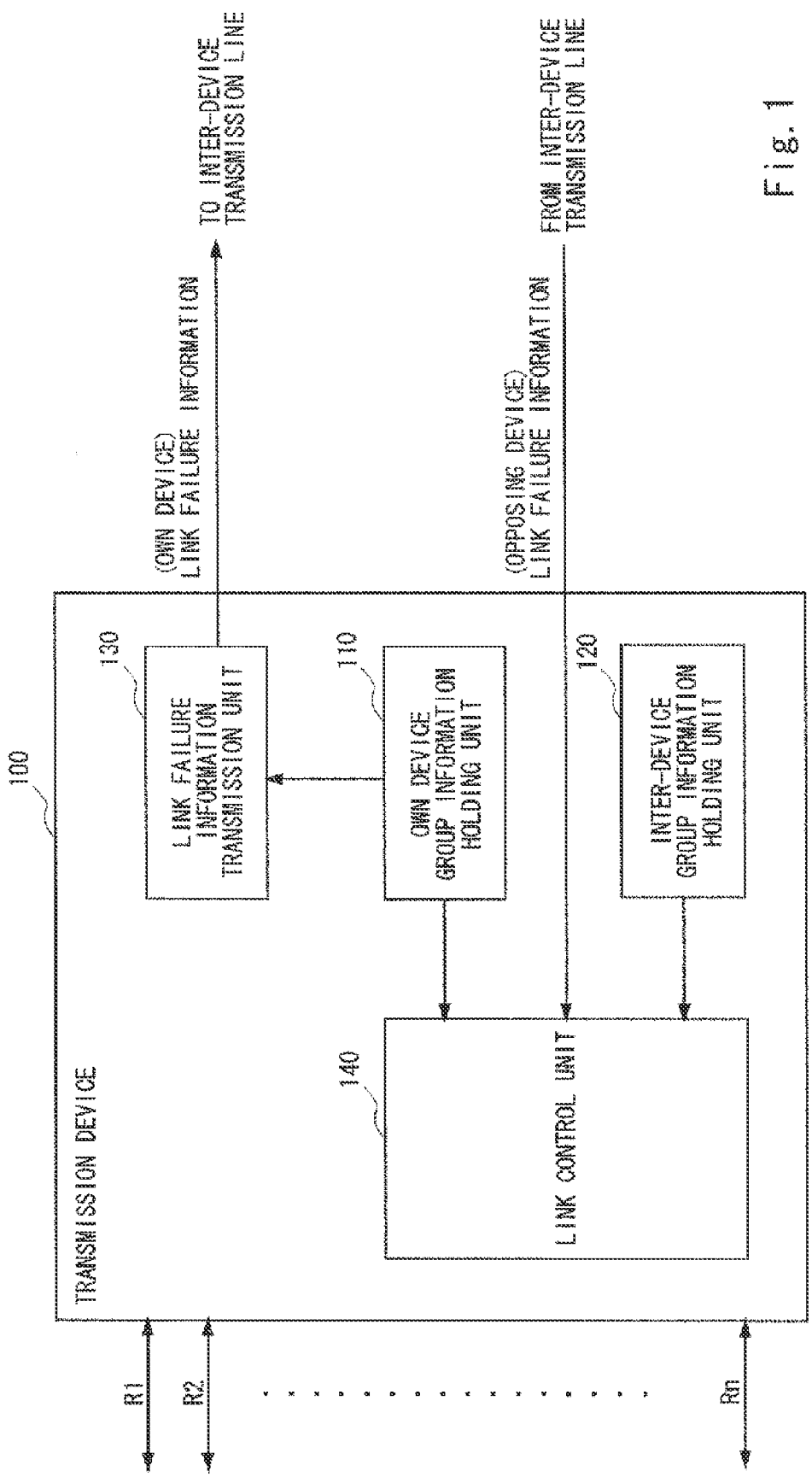
FIG. 1 is a diagram showing a transmission device used to explain the principle of the present invention.

Exemplary embodiments of the present invention will be described below with reference to the drawings. The following description and the drawings are omitted and simplified as appropriate to clarify the explanation. The elements illustrated in the drawings as functional blocks for performing various processes can be implemented hardwarewise by a CPU, a memory, and other circuits, and softwarewise by a program loaded onto a memory, or the like. Accordingly, it is to be understood by those skilled in the art that these functional blocks can be implemented in various forms including, but not limited to, hardware alone, software alone, and a combination of hardware and software. Note that the same elements are denoted by the same reference numerals, and a repeated explanation is omitted as needed.

The above-mentioned program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line, such as an electric wire or an optical fiber, or a wireless communication line.

Prior to the description of exemplary embodiments of the present invention, the principle of the technique according to the present invention will first be described with reference to FIG. 1.

FIG. 1 shows one of a pair of transmission devices connected opposite each other through an inter-transmission-device transmission line (hereinafter abbreviated as "inter-device transmission line"), and one of the pair of transmission devices is connected to a plurality of wired transmission lines (R1, R2, . . . , and Rn). A transmission device 100 shown in FIG. 1 and a transmission device which is connected opposite to the transmission device 100 have a similar configuration.

FIG. 1 shows only portions necessary for explaining the technique according to the present invention, and the illustration and explanation of other options typically included in a transmission device of this type are omitted.

The transmission device 100 receives signals through the wired transmission lines R1, R2, . . . , and Rn from a network device (not shown), such as a LAN, which is connected to these wired transmission lines, and transmits the signals to the opposing transmission device through the inter-device transmission line. Further, the transmission device 100 receives signals, which are transmitted from the opposing transmission device through the inter-device transmission line, through the plurality of wired transmission lines connected to the opposing transmission device, and outputs the signals to any of the wired transmission lines R1, R2, . . . , and Rn. These operations are similar to those of the typical transmission device.

The transmission device 100 includes an own device group information holding unit 110, an inter-device group information holding unit 120, a link failure information transmission unit 130, and a link control unit 140.

The own device group information holding unit 110 holds own device group information. The own device group information indicates a correspondence relation between each of the wired transmission lines R1, R2, . . . , and Rn, which are connected to the transmission device 100, and a link group to which each of the wired transmission lines belongs. One link group includes at least one of the wired transmission lines R1, R2, . . . , and Rn, and the inter-device transmission line. One wired transmission line belongs to one link group. This own device group information can be arbitrarily set by a user.

FIG. 2 shows an example of the own device group information when four wired transmission lines (R1, R2, R3, and R4) are connected to the transmission device 100. As shown in the drawing, the transmission device 100 includes three link groups in this example. A link group 1A includes the wired transmission lines R1 and R2 and the inter-device transmission line. A link group 2A includes the wired transmission line R3 and the inter-device transmission line. A link group 3A includes the wired transmission line R4 and the inter-device transmission line.

The own device group information holding unit 110 holds the own device group information set by the user in the manner as described above.

The inter-device group information holding unit 120 holds inter-device group information. The inter-device group information indicates a correspondence relation between each link group of the transmission device 100 and each link group of the opposing transmission device. The inter-device group information can also be arbitrarily set by the user.

FIG. 3 shows an example of the inter-device group information when the transmission device 100 includes the own device group information shown in FIG. 2. In FIG. 3, "own device link group" indicates each link group in the transmission device 100, and "opposing device link group" indicates each link group in the opposing transmission device. In this example, the link groups in the opposing transmission device include a link group 1B, a link group 2B, and a link group 3B.

As shown in FIG. 3, in this example, the link group 1A in the transmission device 100 corresponds to the link groups 1B and 2B in the opposing transmission device; the link group 2A corresponds to the link group 2B; and the link group 3A corresponds to the link group 3B.

The inter-device group information holding unit 120 holds the inter-device group information set by the user in the manner as described above.

The link failure information transmission unit 130 transmits link failure information, which indicates, for each group, a fault in the wired transmission line in the transmission device 100, to the opposing transmission device. For example, when a fault is detected in one of the wired transmission lines R1, R2, R3, and R4 (for example, when the signal from the wired transmission line is abnormal), the link failure information transmission unit 130 refers to the own device group information held in the own device group information holding unit 110, and transmits the link failure information on the group to which the wired transmission line belongs. Specifically, in the case of the own device group information shown in FIG. 2, for example, when a fault is detected in the wired transmission line R1, the link failure information transmission unit 130 outputs the link failure information indicating the fault in the "link group 1A" to the inter-device transmission line, and transmits the link failure information to the opposing transmission device. For example, when a fault is detected in the wired transmission line R3, the link failure information transmission unit 130 outputs the link failure information indicating the fault in the "link group 2A" to the inter-device transmission line, and transmits the link failure information to the opposing transmission device.

Instead of transmitting the link failure information on the link group, to which the wired transmission line belongs, when a fault is detected in one of the wired transmission lines R1, R2, R3, and R4, the link failure information on the link group may be transmitted when a fault is detected in all wired transmission lines in a certain link group. Specifically, for example, when a fault is detected in both the wired transmission line R1 and the wired transmission line R2, the link failure information on the link group 1A is transmitted, and when a fault is detected in either one of the wired transmission line R1 and the wired transmission line R2, the link failure information on the link group 1A is not transmitted.

The user sets a policy as to whether to transmit the link failure information on the group to which the wired transmission line belongs when a fault is detected in one of wired transmission lines, or whether to transmit the link failure information on the link group when a fault is detected in all wired transmission lines belonging to the link group. The link failure information transmission unit 130 transmits the link failure information in accordance with the policy set by the user.

When a fault is detected in any of the wired transmission lines connected to the transmission device 100, when a fault is detected in the inter-device transmission line, and when the link failure information is received from the opposing transmission device, the link control unit 140 disconnects the wired transmission line connected to the transmission device 100, thereby notifying the network device, which is connected to the wired transmission line, of the fault.

Specifically, when a fault is detected in any of the wired transmission lines connected to the transmission device 100, the link control unit 140 disconnects the wired transmission line.

When a fault is detected in the inter-device transmission line, the link control unit 140 disconnects all wired transmission lines connected to the transmission device 100.

Further, upon receiving the link failure information (opposing device link failure information) indicating a fault in any of the link groups in the opposing transmission device through the inter-device transmission line, the link control unit 140 refers to the inter-device group information held in the inter-device group information holding unit 120 and the own device group information held in the own device group information holding unit 110, and disconnects all the wired transmission lines included in the own device link group corresponding to the link group in the opposing transmission device indicated by the opposing device link failure information.

Specific examples will be described with reference to FIGS. 2 and 3.

For example, upon receiving the link failure information on the link group 2B from the opposing transmission device, the link control unit 140 first refers to the inter-device group information (FIG. 3) held in the inter-device group information holding unit 120, and extracts the link group 1A and the link group 2A as the own device link group corresponding to the link group 2B. Then, the link control unit 140 refers to the own device group information held in the own device group information holding unit 110, and disconnects all the wired transmission lines R1, R2, and R3 included in the link group 1A and the link group 2A. For example, the link failure information from the opposing transmission device indicates the link group 1B, the link control unit 140 disconnects the wired transmission lines R1 and R2 included in the link group 1A corresponding to the link group 1B.

Thus, according to the technique of the present invention, the wired transmission lines on the respective transmission devices are grouped and correlated to each other. Then, fault notification to the opposing transmission device is performed using the link failure information on the own device side, and disconnection of the wired transmission line on the own device side is performed for each group based on the link failure information from the opposing transmission device. This makes it possible to avoid disconnection of all the wired transmission lines on the other transmission device due to the fault in any of the wired transmission lines on one of the transmission devices. Consequently, it is possible to avoid disconnection of the wired transmission lines on the opposing transmission device, which have no correlation with the wired transmission line in which the fault occurs, during the fault notification, thereby avoiding deterioration in communication efficiency of the entire system.

The case where a transmission device is connected to a single opposing transmission device through a single inter-device transmission line has been described above by way of example. The technique according to the present invention can also be applied to a system in which a certain transmission device is connected to a plurality of opposing transmission devices through a plurality of inter-device transmission lines. The above-mentioned advantageous effects can be obtained also when the technique according to the present invention is applied to such a system.

For example, assume that the transmission device 100 shown in FIG. 1 is connected to the wired transmission lines R1, R2, R3, and R4, is connected to a first opposing transmission device including three link groups 1B, 2B, and 3B through a first inter-device transmission line, and is connected to a second opposing transmission device including two link groups 1C and 2C through a second inter-device transmission line. Note that the first opposing transmission device is identical with the opposing transmission device described above.

FIG. 4 shows an example of the own device group information which is held in the own device group information holding unit 110 of the transmission device 100 in this case. As shown in the drawing, the transmission device 100 includes three link groups, and each of the link groups includes one or more wired transmission lines and one or more inter-device transmission lines.

FIG. 5 shows an example of the inter-device group information which is held in the inter-device group information holding unit 120 of the transmission 100 in this case. As shown in the drawing, in this case, the link groups in the transmission device 100 are correlated to the respective link groups in the opposing transmission device.

For example, in the transmission device 100, when a fault is detected in the wired transmission line R1, the link failure information transmission unit 130 outputs the link failure information on the link group 1A, to which the wired transmission line R1 belongs, to the first inter-device transmission line, and notifies the first opposing transmission device of the fault in the link group 1A. Since the second inter-device transmission line is not included in the link group 1A, the link failure information transmission unit 130 does not transmit the information for notifying the second inter-device transmission line of the fault in this case.

For example, when a fault is detected in the wired transmission line R2 in the transmission device 100, the link failure information transmission unit 130 outputs the link failure information on the link group 2A, to which the wired transmission line R2 belongs, to each of the second inter-device transmission line and the second inter-device transmission line, and notifies the first and second opposing transmission devices of the fault in the link group 2A.

For example, upon receiving the link failure information on the link group 1C from the second opposing transmission device, the link control unit 140 in the transmission device 100 first extracts the own device link group (link group 2A) corresponding to the link group 1C from the inter-device group information held in the inter-device group information holding unit 120. Then, the link control unit 140 refers to the own device group information held in the own device group information holding unit 110, and disconnects all the wired transmission lines (R2 and R3) included in the link group 2A.

Further, upon detecting a fault in the first inter-device transmission line, the link control unit 140 refers to the own device group information held in the own device group information holding unit 110, and disconnects the wired transmission lines (R1, R2, and R3) belonging to all the link groups (link groups 1A and 2B) including the first inter-device transmission line. When a fault is detected in the second inter-device transmission line, the link control unit 140 refers to the own device group information held in the own device group information holding unit 110, and disconnects the wired transmission lines (R2, R3, and R4) belonging to all the link groups (link groups 2A and 3A) including the second inter-device transmission line.

On the basis of the principle described above, a system that embodies the technique according to the present invention will be described.

Figure 6:
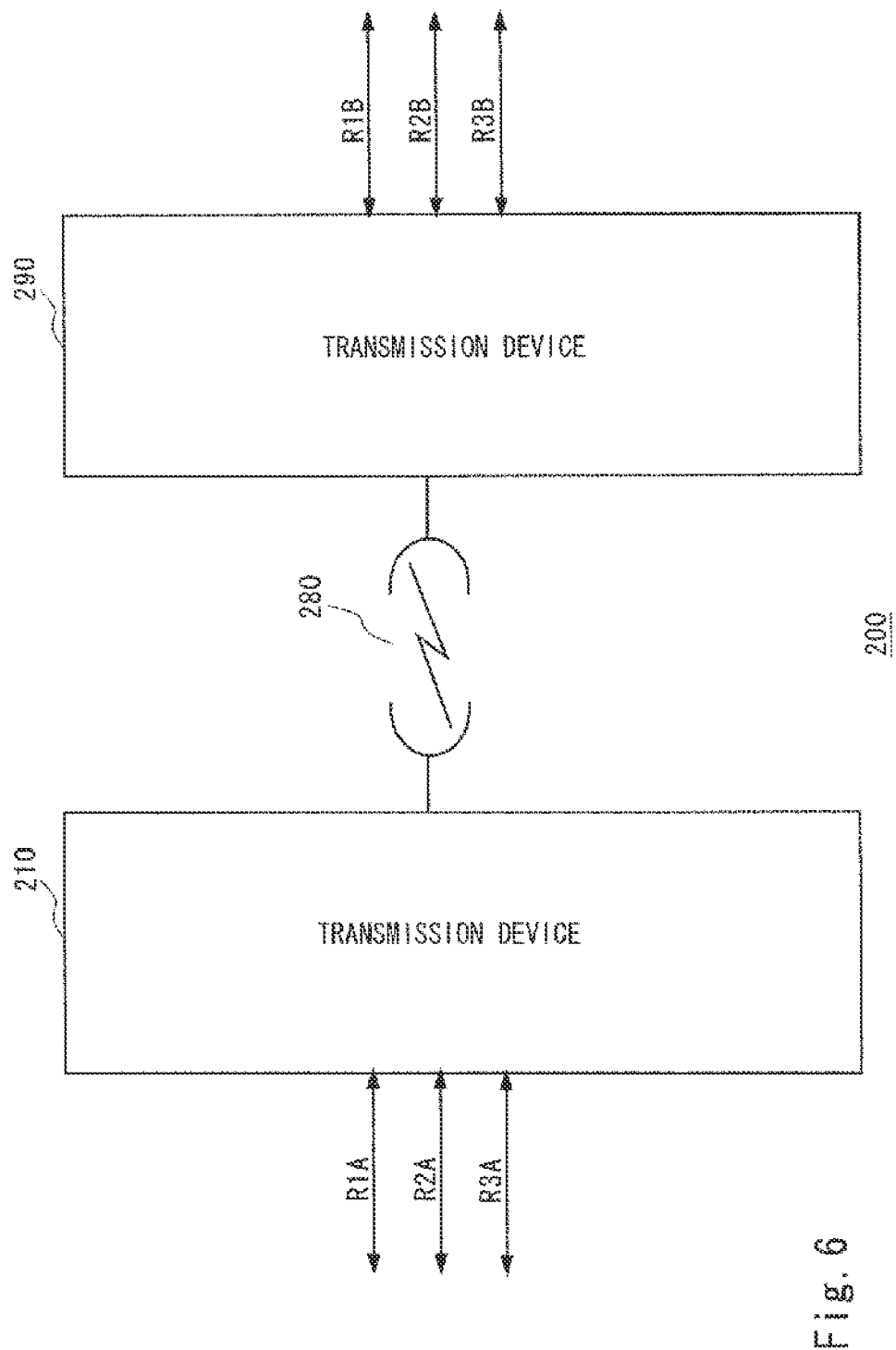
FIG. 6 is a diagram showing a transmission system illustrating an exemplary embodiment of the present invention.

FIG. 6 shows a transmission system 200 according to an exemplary embodiment of the present invention. The transmission system 200 includes a transmission device 210 connected to a plurality of (for example, three in this case) wired transmission lines R1A, R2A, and R3A; a transmission device 290 connected to a plurality of (for example, three in this case) wired transmission lines R1B, R2B, and R3B; and a wireless transmission line 280 serving as an inter-device transmission line for connecting the transmission device 210 and the transmission device 290 to be opposite each other. Each wired transmission line is connected to a LAN device, which is not shown, such as a hub, a switching hub, a router, or a computer terminal.

The transmission device 210 converts LAN data from a network device connected through the wired transmission lines R1A, R2A, and R3A into a radio signal, outputs the radio signal to the wireless transmission line 280, and transmits the radio signal to the transmission device 290. The transmission device 290 converts the radio signal, which is transmitted from the transmission device 210 through the wireless transmission line 280, into LAN data, outputs the LAN data to the corresponding wired transmission line among the wired transmission lines R1B, R2B, and R3B, and transmits the LAN data to a network device connected to the wired transmission line.

Similarly, the transmission device 290 converts the LAN data, which is transmitted from the network device connected through the wired transmission lines R1B, R2B, and R3B, into a radio signal, outputs the radio signal to the wireless transmission line 280, and transmits the radio signal to the transmission device 210. The transmission device 210 converts the radio signal, which is transmitted from the transmission device 290 through the wireless transmission line 280, into LAN data, outputs the LAN data to the corresponding wired transmission line among the wired transmission lines R1A, R2A, and R3A, and transmits the LAN data to the network device connected to the wired transmission line.

Each of the transmission device 210 and the transmission device 290 detects a fault in the wired transmission lines connected to the own device. Further, when a fault is detected, each of the transmission device 210 and the transmission device 290 performs disconnection of the wired transmission lines and fault notification to the opposing transmission device. Also when a fault notification is received from the opposing transmission device, each of the transmission device 210 and the transmission device 290 performs disconnection of the wired transmission lines connected to the own device.

The transmission device 210 and the transmission device 290 are opposing transmission devices and have the same configuration. The transmission device 210 and the transmission device 290 will now be described in detail by taking the transmission device 210 as an example.

Figure 7:
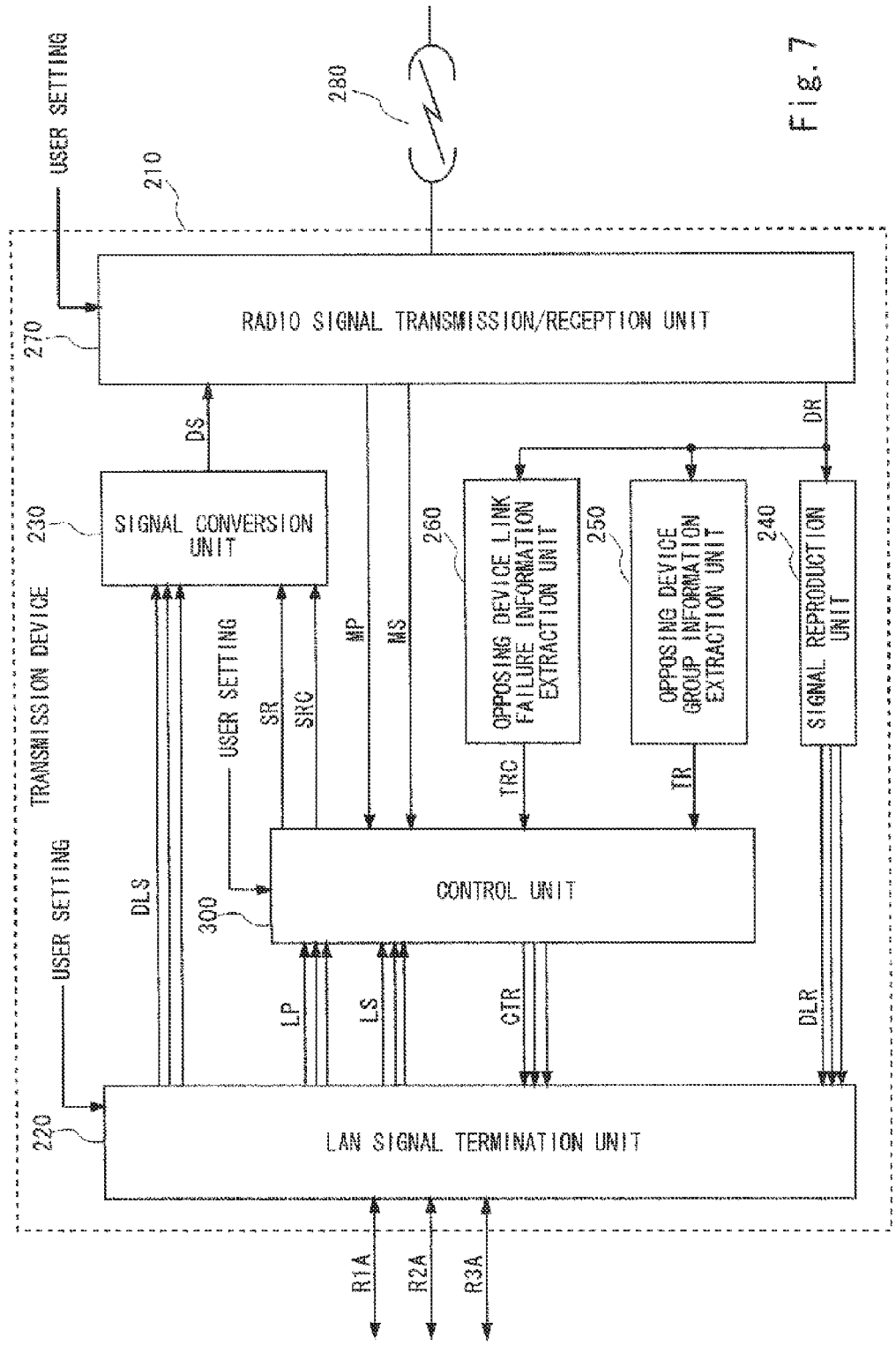
FIG. 7 is a diagram showing a transmission device in the transmission system shown in FIG. 6.

FIG. 7 is a diagram showing the transmission device 210. The transmission device 210 includes a LAN signal termination unit 220, a signal conversion unit 230, a signal reproduction unit 240, an opposing device group information extraction unit 250, an opposing device link failure information extraction unit 260, and a radio signal transmission/reception unit 270.

The LAN signal termination unit 220 establishes a link in a data link layer with the network device, which is connected to the wired transmission lines, according to a LAN signal through the wired transmission lines R1A, R2A, and R3A. LAN data DLS, which is output from the network device, is transmitted to the signal conversion unit 230 through the wired transmission line with which the link to the network device, which is not shown, is established among the wired transmission lines.

In this exemplary embodiment, a user can arbitrarily set a use state indicating "used" or "unused" for each wired transmission line in the transmission device 210. The LAN signal termination unit 220 outputs, to the control unit 300, LAN port information LP indicating the "used" or "unused" state which is set by the user for each wired transmission line. Assume herein that all the wired transmission lines (wired transmission lines R1A, R2A, and R3A) in the transmission device 210 are set to the "used" state.

The LAN signal termination unit 220 outputs, to the control unit 300, fault information LS, which indicates the occurrence of a fault, for each wired transmission line in which a fault occurs, among the wired transmission lines R1A, R2A, and R3A. Examples of the case where "a fault occurs in a wired transmission line" include a case where no link is established with the network device connected to the wired transmission line even when the "used" is set, and a case where the LAN data DLS received through the wired transmission line is abnormal data.

The LAN signal termination unit 220 receives LAN data DLR from the signal reproduction unit 240, and outputs the LAN data DLR to the network device through the wired transmission line with which a link is established.

Furthermore, the LAN signal termination unit 220 monitors link failure control signal CTR which is output from the control unit 300 as described later, and disconnects the wired transmission line indicated by the link failure control signal CTR during the time when the link failure control signal CTR is detected. The disconnection of a wired transmission line means a disconnection of a link with the network device connected to the wired transmission line.

The signal conversion unit 230 multiplexes the LAN data DLS received from the LAN signal termination unit 220, and own device group information SR and link failure information SRC which are received from the control unit 300, to generate transmit data DS, and outputs the generated transmit data to the radio signal transmission/reception unit 270.

The signal reproduction unit 240 extracts a LAN signal from received data DR, which is transmitted by the transmission device 290 and received by the radio signal transmission/reception unit 270, converts the LAN signal into the LAN data DLR, and outputs the LAN data DLR to the LAN signal termination unit 220.

The opposing device group information extraction unit 250 extracts group information TR in the transmission device 290 from the received data DR, and outputs the group information TR to the control unit 300. Note that the group information TR in the transmission device 290 is the own device group information SR for the transmission device 290, and is hereinafter referred to as "opposing device group information" so as to be distinguished from the own device group information SR in the transmission device 210.

The opposing device link failure information extraction unit 260 extracts link failure information TRC in the transmission device 290 from the received data DR, and outputs the link failure information TRC to the control unit 300. The link failure information TRC in the transmission device 290 is hereinafter referred to as "opposing device link failure information" so as to be distinguished from the link failure information in the transmission device 210.

The radio signal transmission/reception unit 270 converts the transmit data DS from the signal conversion unit 230 into a radio signal, and outputs the radio signal to the transmission device 290 through the wireless transmission line 280 and also outputs the radio signal, which is received from the transmission device 290 through the wireless transmission line 280, to each of the signal reproduction unit 240, the opposing device group information extraction unit 250, and the opposing device link failure information extraction unit 260, as the received data DR.

In this exemplary embodiment, the use state indicating the "used" or "unused" state of the wireless transmission line 280 can also be arbitrarily set by the user. The radio signal transmission/reception unit 270 generates wireless port information MP indicating the "used" or "unused" state, which is set by the user, for the wireless transmission line 280, and outputs the wireless port information MP to the control unit 300. Assume herein that the wireless transmission line 280 is set to the "used" state, because only the wireless transmission line 280 is used as the wireless transmission line.

Furthermore, the radio signal transmission/reception unit 270 monitors the fault status of the wireless transmission line 280. When a fault occurs, the radio signal transmission/reception unit 270 generates wireless section fault information MS and outputs the wireless section fault information MS to the control unit 300. Examples of the case where "a fault occurs in the wireless transmission line 280" include a case where the wireless transmission line 280 is disconnected, and a case where the radio signal received from the wireless transmission line 280 is abnormal.

The control unit 300 receives the LAN port information LP and the fault information LS from the LAN signal termination unit 220; the wireless port information MP and the wireless section fault information MS from the radio signal transmission/reception unit 270; the opposing device group information TR from the opposing device group information extraction unit 250; and the opposing device link failure information TRC from the opposing device link failure information extraction unit 260. The control unit 300 outputs the own device group information SR and the link failure information SRC to the signal conversion unit 230, and also outputs the link failure control signal CTR to the LAN signal termination unit 220. The user can perform various settings, which are described later, for the control unit 300.

Figure 8:
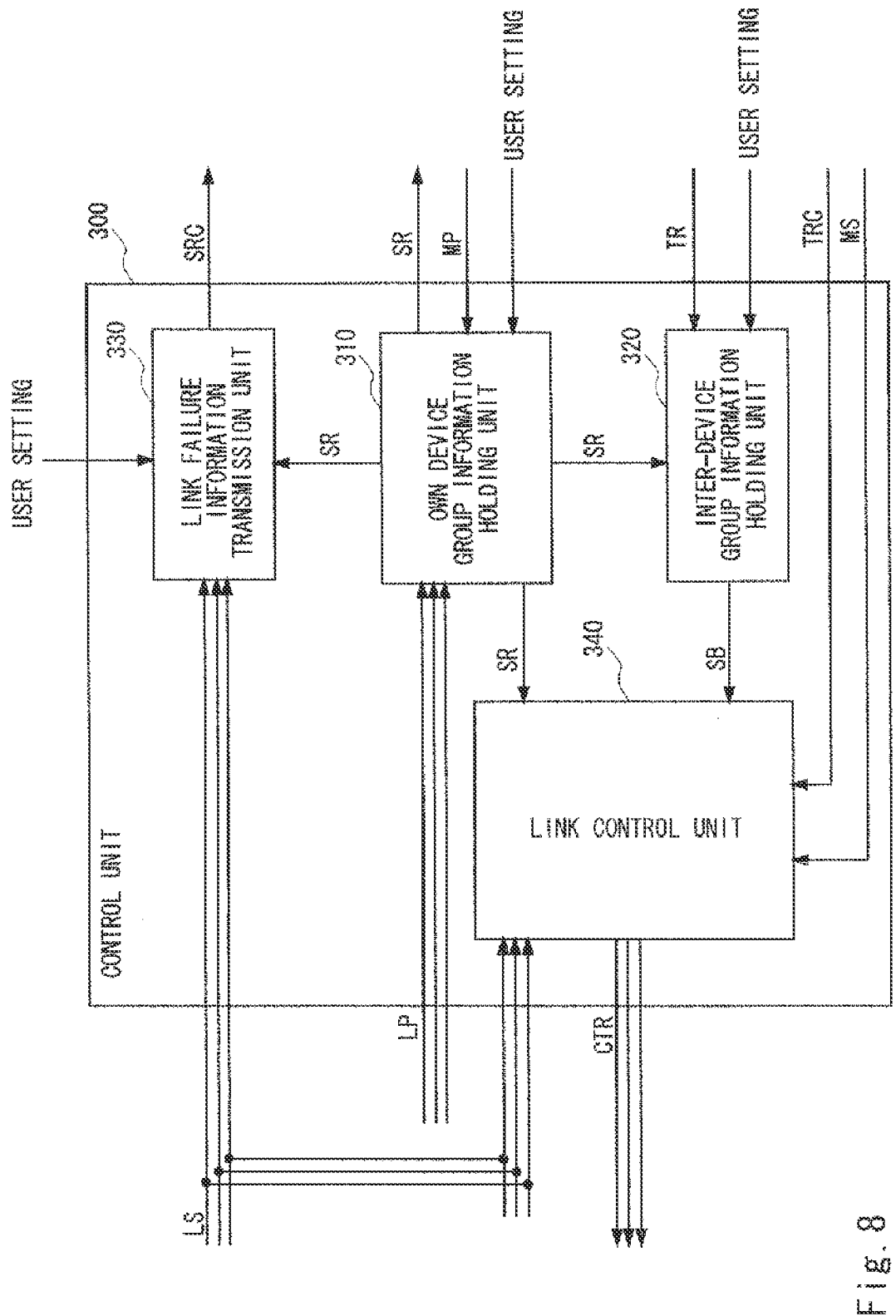
FIG. 8 is a diagram showing a control unit in the transmission device shown in FIG. 7.

The control unit 300 will be described in detail with reference to FIG. 8.

The control unit 300 includes an own device group information holding unit 310, an inter-device group information holding unit 320, a link failure information transmission unit 330, and a link control unit 340.

The own device group information holding unit 310 receives the LAN port information LP and the wireless port information MP, and generates the own device group information SR. This own device group information SR indicates a correspondence relation between the wired transmission lines (R1A, R2A, and R3A in this case), which are set to the "used" state and connected to the transmission device 210, and the link groups to which the wired transmission lines belong. One link group includes at least one of the wired transmission lines R1A, R2A, and R3A, and the wireless transmission line (the wireless transmission line 280 in this case) which is set to the "used" state. As described above, one wired transmission line may belong to a plurality of link groups. This own device group information can be arbitrarily set by the user. The own device group information holding unit 310 generates and holds the own device group information SR based on the LAN port information LP, the wireless port information MP, and the user's setting, and outputs the own device group information SR to the link failure information transmission unit 330.

The inter-device group information holding unit 320 receives the opposing device group information TR from the opposing device group information extraction unit 250, and refers to the own device group information SR, which is held in the device group information holding unit 310, to generate and hold inter-device group information SB. The inter-device group information SB indicates a correspondence relation between each link group of the transmission device 210 indicated by the own device group information SR, and each link group of the transmission device 290 indicated by the opposing device group information TR. The inter-device group information holding unit 320 generates the inter-device group information SB according to the user's setting.

The link failure information transmission unit 330 generates the link failure information SRC indicating, for each group, a fault in the wired transmission line in the "used" state in the transmission device 210, and outputs the link failure information SRC to the signal conversion unit 230. This link failure information SRC is output to the wireless transmission line 280 by each of the signal conversion unit 230 and the radio signal transmission/reception unit 270, and is transmitted to the transmission device 290.

Specifically, the link failure information transmission unit 330 generates the link failure information SRC according to the fault notification policy, which is set by the user, based on the fault information LS received from the LAN signal termination unit 220. The fault notification policy set by the user indicates that "if a certain link group includes at least one wired transmission line in which a fault occurs, the fault information LS for the link group is generated", or that "only when a fault occurs in all wired transmission lines belonging to a certain link group, the fault information LS for the link group is generated", for example.

In this exemplary embodiment, assume that the fault notification policy set to the link failure information transmission unit 330 by the user indicates that "only when a fault occurs in all wired transmission lines belonging to a certain link group, the fault information LS for the link group is generated".

Accordingly, upon receiving the fault information LS from the LAN signal termination unit 220, the link failure information transmission unit 330 refers to the own device group information SR held in the own device group information holding unit 310, and confirms the presence or absence of a link group in which a fault occurs in all wired transmission lines belonging to the link group. When such a link group is present, the link failure information transmission unit 330 generates the link failure information SRC on the link group and outputs the link failure information SRC to the signal conversion unit 230. If there is not such a link group, the link failure information transmission unit 330 does not generate and output the link failure information SRC.

The link control unit 340 disconnects the wired transmission line when a fault occurs in any of the wired transmission lines R1A, R2A, and R3A, when a fault occurs in the wireless transmission line 280, and when the opposing device link failure information TRC is received from the transmission device 290.

Specifically, the link control unit 340 disconnects the wired transmission line when the fault information LS received from the LAN signal termination unit 220 indicates that a fault occurs in any of the wired transmission lines R1A, R2A, and R3A.

Further, when the wireless section fault information MS from the radio signal transmission/reception unit 270 indicates that a fault occurs in the wireless transmission line 280, the link control unit 340 disconnects all the wired transmission lines R1A, R2A, and R3A.

Furthermore, upon receiving the opposing device link failure information TRC from the opposing device link failure information extraction unit 260, the link control unit 340 refers to the own device group information SR held in the own device group information holding unit 310 and the inter-device group information SB held in the inter-device group information holding unit 320, and disconnects all wired transmission lines included in the own device link group corresponding to the link group (the link group in the transmission device 290) indicated by the opposing device link failure information TRC.

Some operation examples of the transmission system 200 will now be described. To facilitate understanding, emphasis is placed on the flow of the entire system in the description of operation examples, and the operation of each functional block is not specifically described.

First Operation Example

Figure 9:
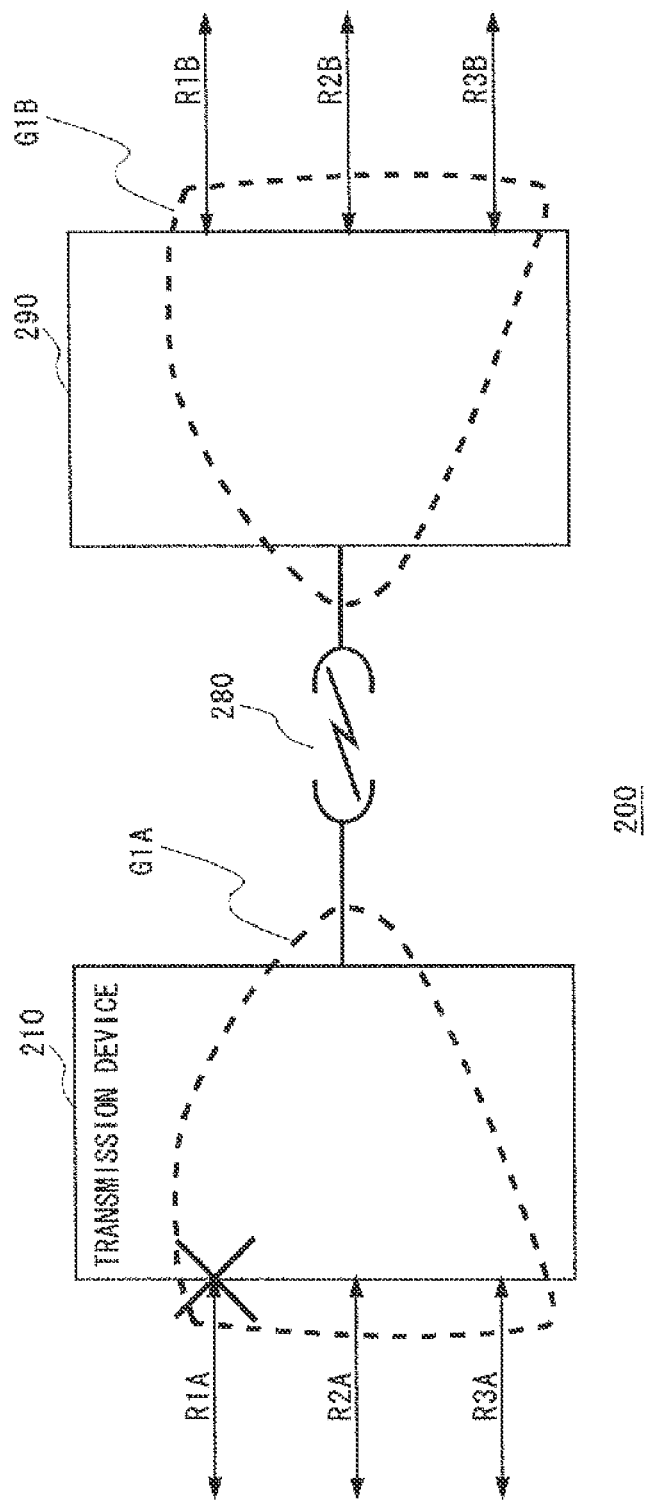
FIG. 9 is a diagram for explaining an operation example (first operation example) of the transmission system shown in FIG. 6.

FIG. 9 is a diagram for explaining a first operation example of the transmission system 200. In FIG. 9, the wired transmission lines and wireless transmission line which are surrounded by the same figure belong to the same link group on the same transmission device side. The link groups represented by the same figure between the transmission device 210 and the transmission device 290 are correlated link groups. A larger symbol "x" indicates that a fault is detected in the transmission line, and a smaller symbol "x" indicates a transmission line disconnected according to the opposing device link failure information TRC. This also holds true for the drawings described later.

In the example shown in FIG. 9, all the wired transmission lines R1A, R2A, and R3A in the transmission device 210 belong to a link group G1A. The link group G1A includes the wired transmission lines R1A, R2A, and R3A and the wireless transmission line 280. All the wired transmission lines in the transmission device 290 belong to a link group G1B. The link group G1B includes the wired transmission lines R1B, R2B, and R3B and the wireless transmission line 280. The link group G1A and the link group G1B are correlated to each other.

As shown in FIG. 9, a fault is detected in the wired transmission line R1A belonging to the link group G1A in the transmission device 210. However, no fault occurs in the other wired transmission lines (R2A, R3A) belonging to the link group G1A and a link is established. Accordingly, the transmission device 210 does not transmit the link failure information SRC to the transmission device 290. Thus, even when a fault occurs in the wired transmission line R1A, communication can be established between each wired transmission line (R1B, R2B, and R3B) belonging to the link group G1B in the transmission device 290, and each of the wired transmission lines R2A and R3A belonging to the link group G1A in the transmission device 210.

Second Operation Example

Figure 10:
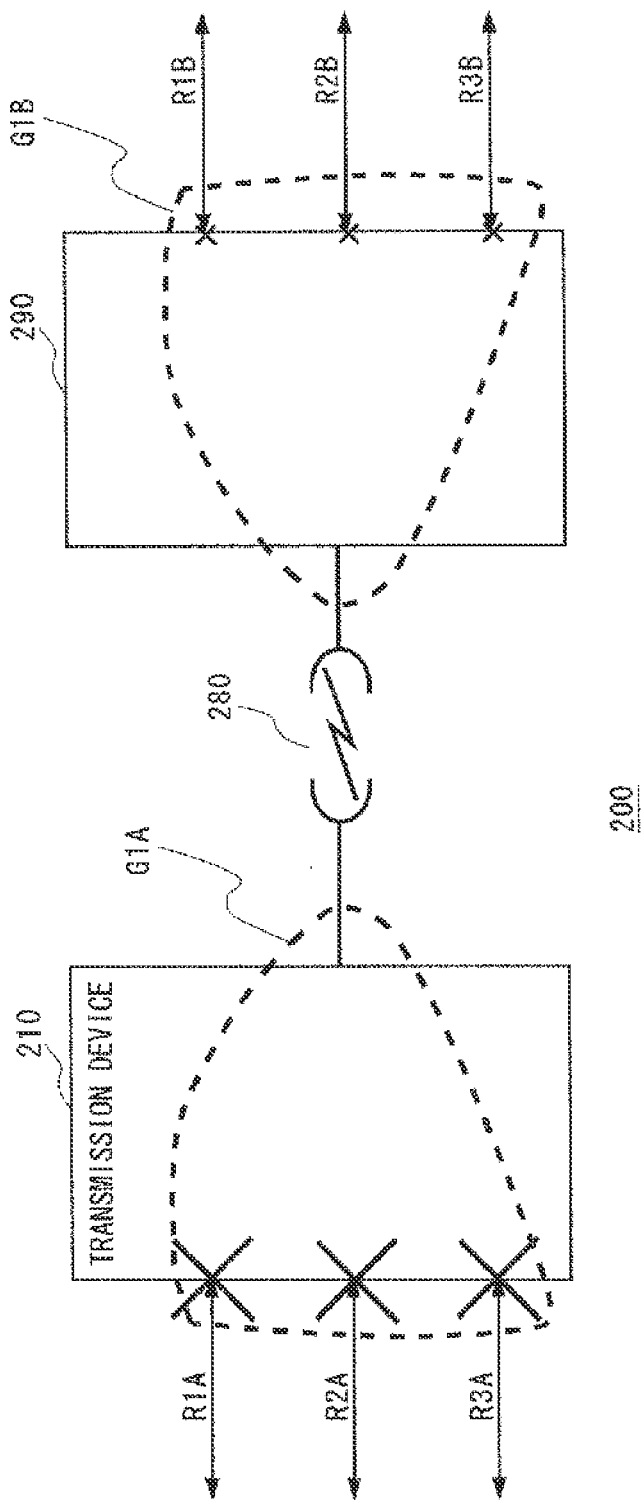
FIG. 10 is a diagram for explaining an operation example (second operation example) of the transmission system shown in FIG. 6.

FIG. 10 shows a second operation example of the transmission system 200. In this operation example, the grouping of the link groups in the transmission device 210 and the transmission device 290 and the correspondence relation of the link groups between the transmission device 210 and the transmission device 290 are similar to those of the example shown in FIG. 9. As shown in FIG. 10, in this example, a fault is detected in all the wired transmission lines (R1A, R2A, and R3A) belonging to the link group G1A in the transmission device 210. Accordingly, the link failure information SRC on the link group G1A is transmitted to the transmission device 290 from the transmission device 210.

As a result, in the transmission device 290, all the wired transmission lines (R1B, R2B, and R3B) belonging to the link group G1B corresponding to the link group G1A are disconnected.

Third Operation Example

Figure 11:
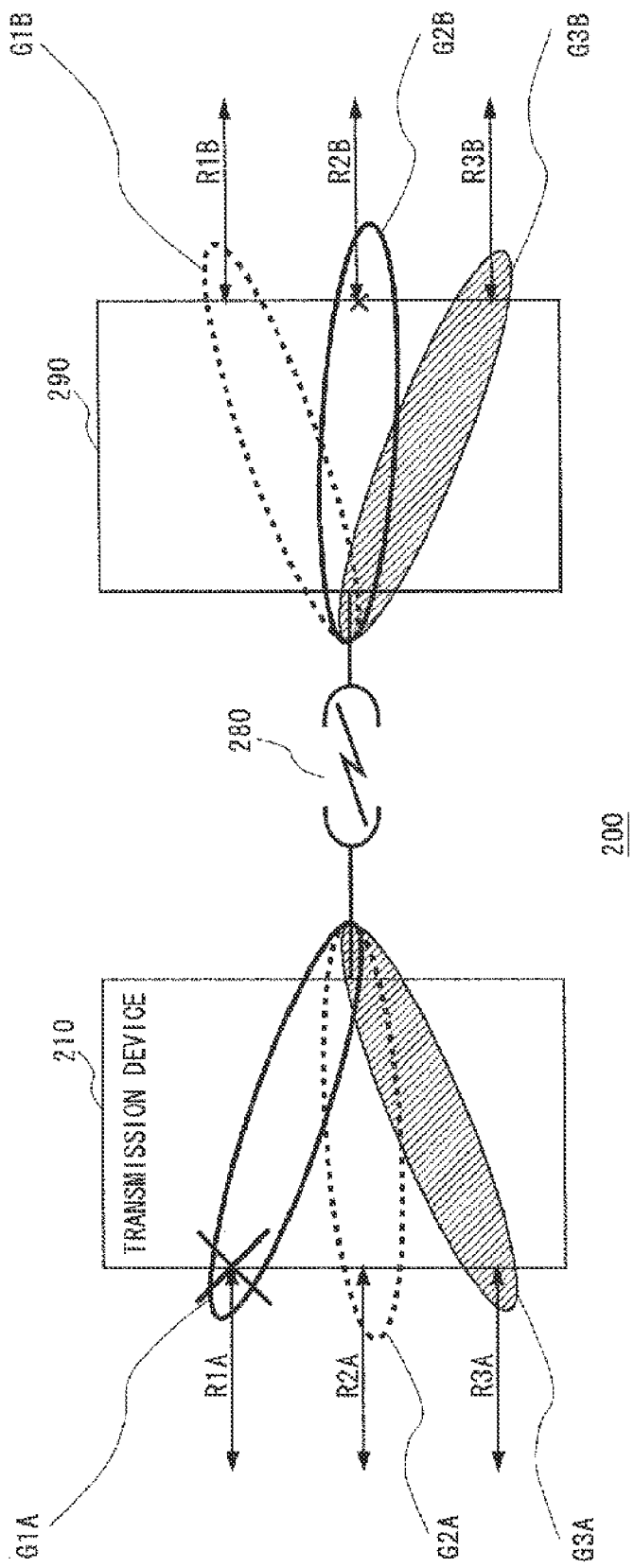
FIG. 11 is a diagram for explaining an operation example (third operation example) of the transmission shown in FIG. 6.

FIG. 11 shows a third operation example of the transmission system 200. As shown in the drawing, three link groups (G1A, G2A, and G3A) are present in the transmission device 210. The link group G1A includes the wired transmission line R1A and the wireless transmission line 280. The link group G2A includes the wired transmission line R2A and the wireless transmission line 280. The link group G3A includes the wired transmission line R3A and the wireless transmission line 280. In the transmission device 290, three link groups (G1B, G2B, and G3B) are present. The link group G1B includes the wired transmission line R1B and the wireless transmission line 280. The link group G2B includes the wired transmission line R2B and the wireless transmission line 280. The link group G3B includes the wired transmission line R3B and the wireless transmission line 280.

Between the transmission device 210 and the transmission device 290, the link group G1A corresponds to the link group G2B; the link group G2A correspond to the link group G1B; and the link group G3A corresponds to the link group G3B.

A fault is detected in the wired transmission line R1A belonging to the link group G1A in the transmission device 210. Since the wired transmission line R1A is only the wired transmission line included in the link group G1A, the link failure information SRC on the link group G1A is transmitted to the transmission device 290 from the transmission device 210.

As a result, in the transmission device 290, all the wired transmission lines (R2B in this example) included in the link group G2B corresponding to the link group G1A are disconnected.

Fourth Operation Example

Figure 12:
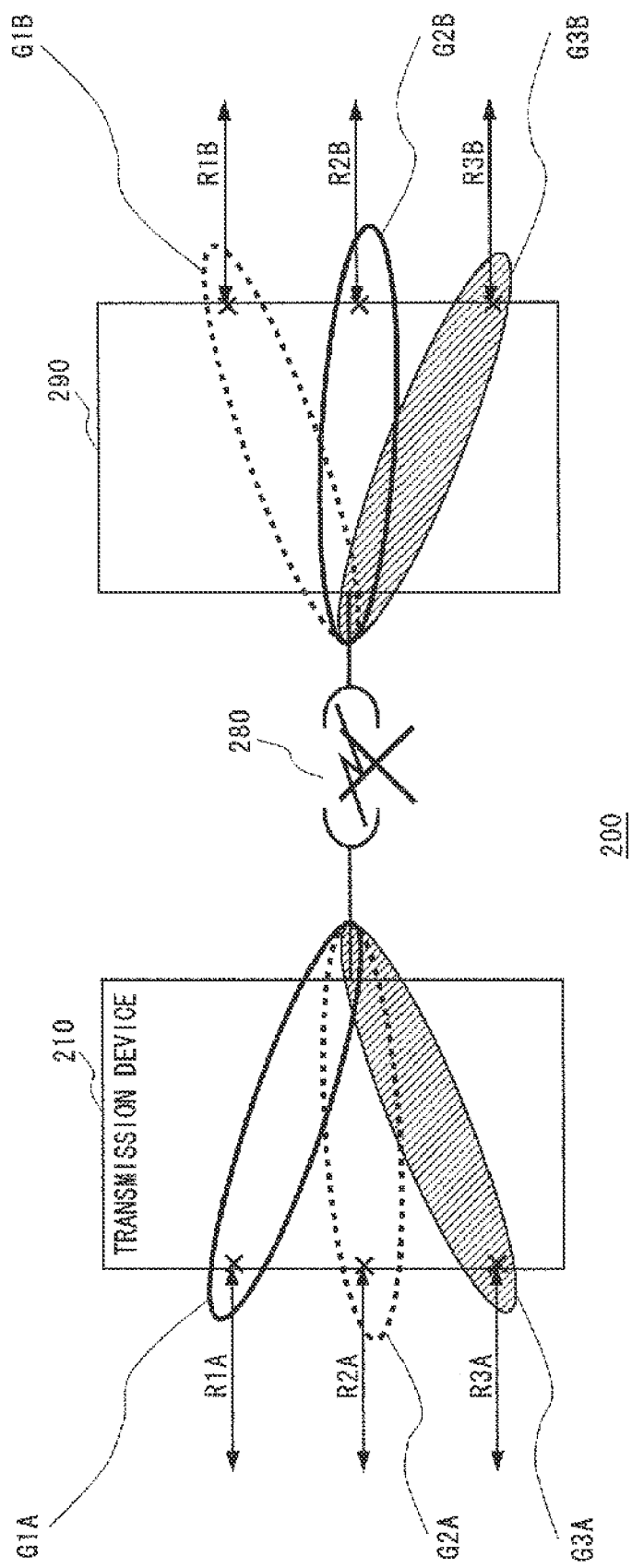
FIG. 12 is a diagram for explaining an operation example (fourth operation example) of the transmission system shown in FIG. 6.

FIG. 12 shows a fourth operation example of the transmission system 200. In this operation example, the grouping of the link groups in the transmission device 210 and the transmission device 290 and the correspondence relation of the link groups between the transmission device 210 and the transmission device 290 are similar to those of the example shown in FIG. 11. As shown in FIG. 12, in this example, a fault is detected in the wireless transmission line 280.

Upon detecting a fault in the wireless transmission line 280, the transmission device 210 disconnects all the wired transmission lines belonging to the link groups, which include the wireless transmission line 280, among the link groups in the transmission device 210. In this example, since the wireless transmission line 280 is included in all the link groups in the transmission device 210, all the wired transmission lines included in all the link groups (G1A, G2A, and G3A), i.e., all the wired transmission lines R1A, R2A, and R3A, are disconnected.

Similarly, upon detecting a fault in the wireless transmission line 280, the transmission device 290 also disconnects all the wired transmission lines belonging to the link groups, which include the wireless transmission line 280, among the link groups in the transmission device 290. Also in the transmission device 290, the wireless transmission line 280 is included in all the link groups. Accordingly, all the wired transmission lines included in all the link groups (G1B, G2B, and G3B), i.e., all the wired transmission lines R1B, R2B, and R3B, are disconnected.

The transmission system 200 of this exemplary embodiment is an embodiment of the principle of the technique according to the present invention, and provides all the advantageous effects described in the description of the principle of the technique according to the present invention.

The present invention has been described above with reference to exemplary embodiments. The exemplary embodiments are illustrated by way of example only. Various alterations, additions, omissions, or combinations may be made with respect to the above-mentioned exemplary embodiments and examples, without departing from the gist of the present invention. Those skilled in the art can understand that modified examples to which these alterations, additions, omissions, or combinations are made also fall within the scope of the present invention.

For example, in the transmission system 200, the inter-transmission-device transmission line is a wireless transmission line, and the transmission device 210 and the transmission device 290 are wireless transmission devices. The technique according to the present invention is not limited to a system which incorporates a wireless transmission line as a part of transmission lines, as in the transmission system 200. Any transmission line such as a wired transmission line or a wireless transmission line may be employed as the inter-transmission-device transmission line. Naturally, also the transmission device is not limited to a wireless transmission device, but may be an optical transmission device, an optical converter, a switching hub, a router, or the like.

The grouping of link groups and the fault notification policy are not limited to the examples described above and can be arbitrarily set by a user without departing from the gist of the present invention.

This application is based upon and claims the benefit of priority from Japanese patent application No. 2010-242092, filed on Oct. 28, 2010, the disclosure of which is incorporated herein in its entirety by reference.

INDUSTRIAL APPLICABILITY

The present invention can be applied to fault notification, and more specifically, the present invention can be applied to notification of a fault in a system in which transmission devices connected through an inter-transmission-device transmission line transmit signals of a plurality of wired transmission lines connected to the transmission devices.

REFERENCE SIGNS LIST

100 TRANSMISSION DEVICE
110 OWN DEVICE GROUP INFORMATION HOLDING UNIT
120 INTER-DEVICE GROUP INFORMATION HOLDING UNIT
130 LINK FAILURE INFORMATION TRANSMISSION UNIT
140 LINK CONTROL UNIT
200 TRANSMISSION SYSTEM
210 TRANSMISSION DEVICE
220 LAN SIGNAL TERMINATION UNIT
230 SIGNAL CONVERSION UNIT
240 SIGNAL REPRODUCTION UNIT
250 OPPOSING DEVICE GROUP INFORMATION EXTRACTION UNIT
260 OPPOSING DEVICE LINK FAILURE INFORMATION EXTRACTION UNIT
270 RADIO SIGNAL TRANSMISSION/RECEPTION UNIT
280 WIRELESS TRANSMISSION LINE
290 TRANSMISSION DEVICE
300 CONTROL UNIT
310 OWN DEVICE GROUP INFORMATION HOLDING UNIT
320 INTER-DEVICE GROUP INFORMATION HOLDING UNIT
330 LINK FAILURE INFORMATION TRANSMISSION UNIT
340 LINK CONTROL UNIT
CTR LINK FAILURE CONTROL SIGNAL
DLS LAN DATA
DLR LAN DATA
DR RECEIVED DATA
DS TRANSMIT DATA
LP LAN PORT INFORMATION
LS FAULT INFORMATION
MP WIRELESS PORT INFORMATION
MS WIRELESS SECTION FAULT INFORMATION
SB INTER-DEVICE GROUP INFORMATION
SR OWN DEVICE GROUP INFORMATION
SRC LINK FAILURE INFORMATION
TR OPPOSING DEVICE GROUP INFORMATION
TRC OPPOSING DEVICE LINK FAILURE INFORMATION

The invention claimed is:

1. A transmission device in a system in which a pair of transmission devices connected opposite each other through an inter-transmission-device transmission line transmits signals of a plurality of wired transmission lines connected to the transmission devices, the transmission device comprising:

own device group information holding means for holding own device group information indicating a correspondence relation between the wired transmission lines connected to the transmission device and link groups to which the wired transmission lines belong, one of the link groups including: at least one wired transmission circuit connected to the transmission device; and the inter-transmission-device transmission line;

inter-device group information holding means for holding inter-device group information indicating a correspondence relation between the link groups of the transmission device and the link groups of the opposing transmission device connected to the transmission device;

link failure information transmission means for transmitting link failure information indicating a fault in a link group to the opposing transmission device connected to the transmission device through the inter-transmission-device transmission line, when a fault in one or more wired transmission lines belonging to any of the link groups of the transmission device is detected, by referring to the own device group information; and link control means configured to:

disconnect, upon detection of a fault in any of the wired transmission lines connected to the transmission device, the wired transmission line;

disconnect, upon detection of a fault in the inter-transmission-device transmission line, all the wired transmission lines connected to the transmission device; and disconnect, upon receiving through the inter-transmission-device transmission line the link failure information indicating a fault in any of the link groups of the opposing transmission device connected to the transmission device, the wired transmission lines included in a link group corresponding to the link group indicated by the received link failure information among the link groups in the transmission device, by referring to the inter-device group information and the own device group information.

2. The transmission device according to claim 1, wherein the inter-transmission-device transmission line is a wireless transmission line.

3. The transmission device according to claim 1, wherein the plurality of wired transmission lines connected to the transmission device is configured to be arbitrarily set to "used" or "unused" by a user, and the own device group information holding means, the inter-device group information holding means, the link failure information transmission means, and the link control means target only the wired transmission lines set to "used".

4. The transmission device according to claim 2, wherein the plurality of wired transmission lines connected to the transmission device is configured to be arbitrarily set to "used" or "unused" by a user, and the own device group information holding means, the inter-device group information holding means, the link failure information transmission means, and the link control means target only the wired transmission lines set to "used".

5. A fault notification method for a transmission device in a system in which a pair of transmission devices connected opposite each other through an inter-transmission-device transmission line transmits signals of a plurality of wired transmission lines connected to the transmission devices, the fault notification method comprising:

holding own device group information indicating a correspondence relation between the wired transmission lines connected to the transmission device and link groups to which the wired transmission lines belong, one of the link groups including: at least one wired transmission circuit connected to the transmission device; and the inter-transmission-device transmission line;

holding inter-device group information indicating a correspondence relation between the link groups of the transmission device and the link groups of the opposing transmission device connected to the transmission device;

transmitting link failure information indicating a fault in a link group to the opposing transmission device connected to the transmission device through the inter-transmission-device transmission line, when a fault in one or more wired transmission lines belonging to any of the link groups of the transmission device is detected, by referring to the own device group information;

disconnecting, upon detection of a fault in any of the wired transmission lines connected to the transmission device, the wired transmission line;

disconnecting, upon detection of a fault in the inter-transmission-device transmission line, all the wired transmission lines connected to the transmission device; and disconnecting, upon receiving through the inter-transmission-device transmission line the link failure information indicating a fault in any of the link groups of the opposing transmission device connected to the transmission device, the wired transmission lines included in a link group corresponding to the link group indicated by the received link failure information among the link groups in the transmission device, by referring to the inter-device group information and the own device group information.

6. A transmission device that connects a plurality of wired transmission lines with a wireless transmission line, comprising:

group information holding means for holding group information indicating a group including: at least one of the plurality of wired transmission lines; and a wireless transmission line; and fault information output means for outputting fault information to the wireless transmission line by referring to the group information, when a fault is detected in any of the plurality of wired transmission lines, wherein upon detection of a fault in only a part of wired transmission lines belonging to the same group, by referring to the group information, the fault information output means does not output the fault information to the wireless transmission line, and upon detection of a fault in all the wired transmission lines belonging to the group, the fault information output means outputs the fault information to the wireless transmission line.

7. The transmission device according to claim 6, wherein the group information holding means holds inter-device group information indicating a correspondence relation between the group and a group of the other opposing transmission device connected to the own device through the wireless transmission line.

8. The transmission device according to claim 6, further comprising link control means for disconnecting, when the transmission device receives fault information from the wireless transmission line, wired transmission lines belonging to a group of the own device corresponding to the group of the other transmission device indicated by the fault information, by referring to the inter-device group information.

9. The transmission device according to claim 7, wherein the link control means disconnects all the wired transmission lines belonging to the group of the own device.

10. The transmission device according to claim 8, further comprising link control means for disconnecting, when the transmission device receives fault information from the wireless transmission line, wired transmission lines belonging to a group of the own device corresponding to the group of the other transmission device indicated by the fault information, be referring to the inter-device group information.

11. The transmission device according to claim 9, wherein the link control means disconnects all the wired transmission lines belonging to the group of the own device.

12. The transmission device according to claim 10, wherein the link control means disconnects all the wired transmission lines belonging to the group of the own device.

* * * * *